July 6, 1943.　　L. S. HARBER　　2,323,537
MANUFACTURE OF BREAD
Filed Sept. 29, 1941　　3 Sheets-Sheet 1
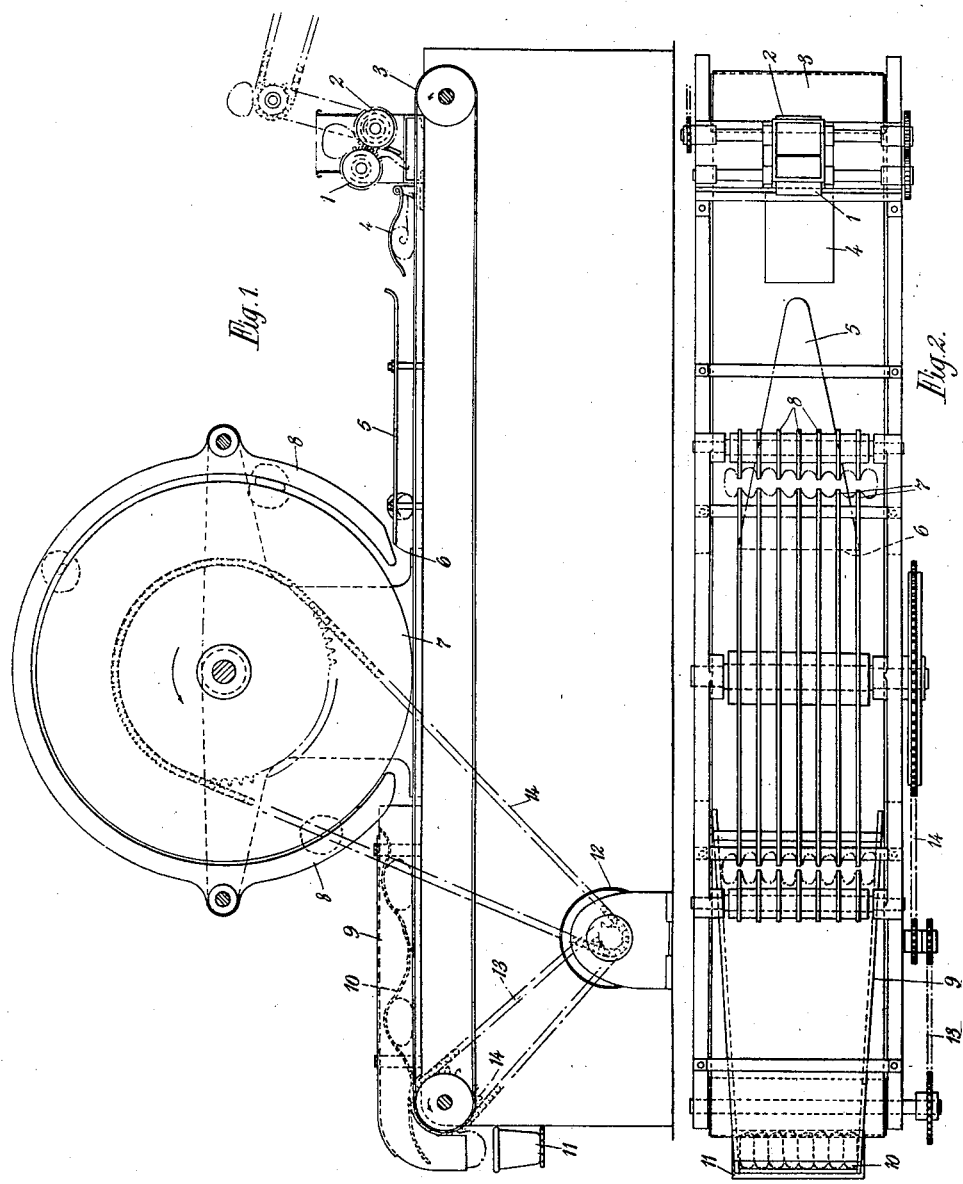
Inventor,
Laurence S. Harber

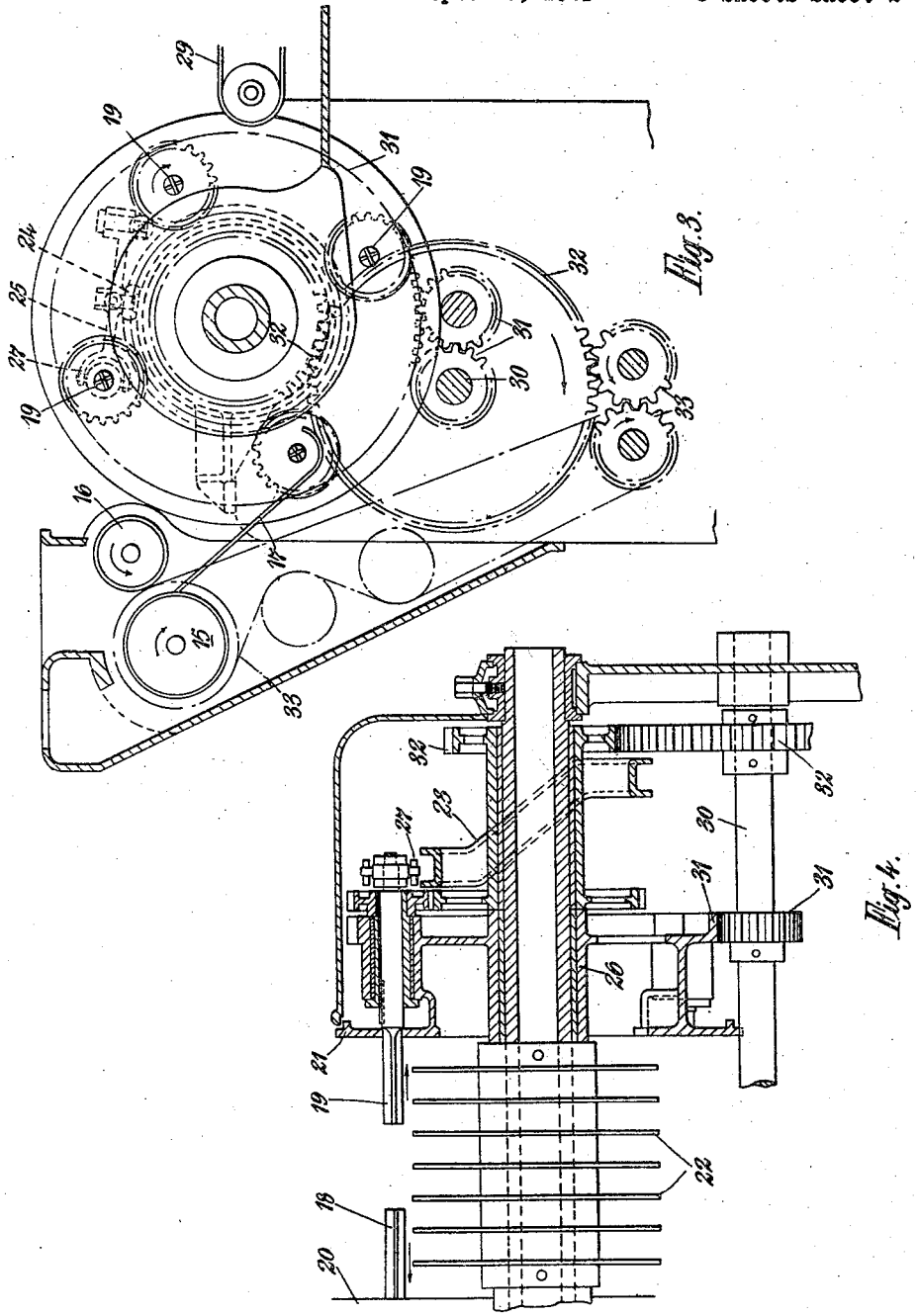

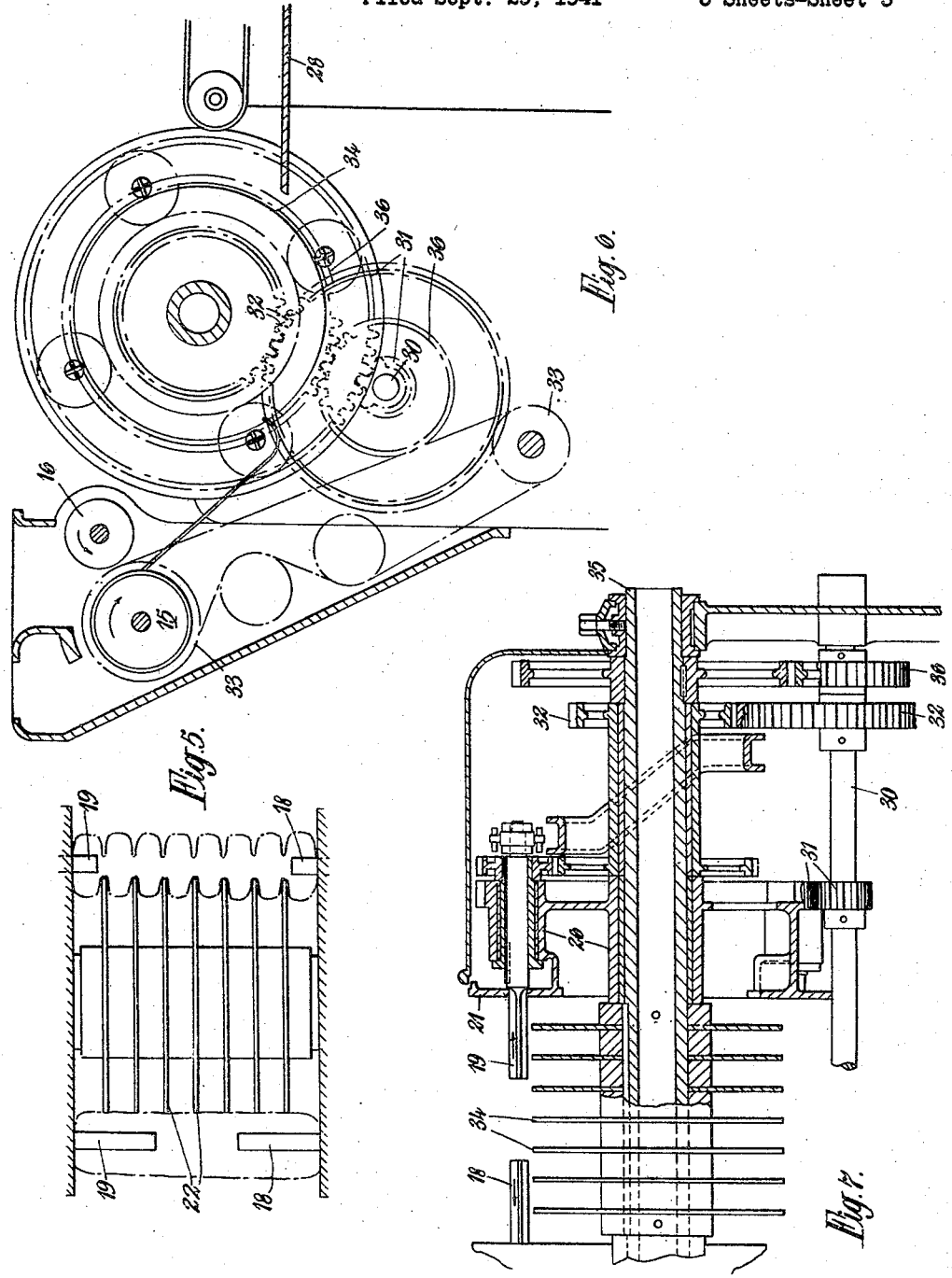

Patented July 6, 1943

2,323,537

UNITED STATES PATENT OFFICE 2,323,537

MANUFACTURE OF BREAD

Laurence Seymour Harber, Peterborough, England, assignor to Baker Perkins Limited, Peterborough, England Application September 29, 1941, Serial No. 412,857
In Great Britain October 9, 1940

12 Claims. (Cl. 107—9)

This invention relates to the manufacture of tin bread having a laminated structure of the character described in patent specification No. 2,045,228, issued June 23, 1936, to L. S. Harber and J. E. Pointon, and has for its object the provision of a mode of treatment which lends itself to mechanical handling and manufacture of laminated loaves at a high rate of output and of a quality equal or not substantially inferior to loaves produced from a series of separate dough pieces such as described in patent specification No. 2,008,036 issued July 16, 1935, to J. E. Pointon and L. S. Harber.

According to the invention a dough piece is given a formation comprising a series of spaced parallel discs or plaques, adjacent discs throughout the piece being connected together by necks or portions of relatively small diameter.

When placed in the baking tin the parallel surface of the discs or plaques are contiguous and the whole constitutes a laminated body which, on baking, produces throughout the masses beanlike or lenticular cells which endow the bread with the superior qualities as explained in the Letters Patent first referred to above.

The invention consists in an apparatus for forming dough pieces in the manufacture of tin bread having a laminated structure of the character described, comprising means for producing a series of spaced annular corrugations in an elongated dough piece to provide spaced parallel plaques connected together by necks of relatively small diameter, conveyor means for receiving the necked dough pieces and feeding them through means for exerting axial pressure on the ends of the necked dough pieces to bring the sides of the plaques into contact with one another and merge the connecting necks into the body of the dough.

According to one form of means for producing the multiple necked discs coaxial spaced discs are provided and means are employed to cause a relative rolling motion to take place between the discs and the cylinders of dough upon which the operation has to be performed to cause the discs to form annular recesses in the dough piece.

The discs may rotate and co-operate with fixed blades or plates spaced from and surrounding the discs.

In the accompanying drawings:

Figure 1 is an elevation of one form of apparatus according to the invention,

Figure 2 is a plan corresponding to Figure 1,

Figures 3 and 4 are respectively side and end elevations of a modified apparatus employing moulding spindles, Figure 5 is a partial plan, Figures 6 and 7 are respectively side and end elevations of a further modification in which moulding spindles are employed.

In carrying the invention into effect according to one convenient mode, described by way of example, dough pieces are handed up (preferably in the form of spheres) containing sufficient dough to make a 2-lb. or loaf of other predetermined weight. These dough pieces are passed between a pair of flanged sheeting rolls 1, 2 and delivered upon an endless band conveyor 3 adapted to carry the pieces forward for the performance of the other steps of the method of manufacture. The sheeted dough pieces pass in succession under a flexible coiling apron 4 and then under a triangular elongating board 5. Over the conveyor, and beyond the base 6 of the triangular board, a series of discs 7 of large diameter are mounted coaxially, which are adapted to rotate to lift the dough pieces upwardly from the conveyor band 3 in succession. The number of discs 7 should be one less than the number of dough plaques it is intended should be comprised within the baking tin. The discs 7 cooperate with fixed round-edged blades or plates disposed in the planes of the discs and spaced from the periphery thereof a distance approximating the predetermined diameter intended for the necks which connect the series of dough plaques together. The space between the fixed plates 8 and the rotating discs 7 may progressively decrease from the entry side to the exit side as will be seen in Figure 1.

As the elongated dough pieces leave the elongating board 5 they are caught by the discs 7 and lifted into the clearance between the fixed plates 8 and the discs, with the consequent result that the pieces are rolled over and over between the discs and plates and are impressed with a series of annular recesses which progressively separate or space the dough piece into a series of discs or plaques connected by narrow necks, and at the same time gradually stretch and extend the dough sealing skin. The disc or plaque form is perfected as the dough pieces travel round the circumference of the recessing discs. On release by the discs the dough pieces are delivered back upon the endless band conveyor 3, which forwards them to means adapted to compress them axially as they pass along towards the delivery point to the tins. For example, a pair of lateral converging boards 9 may be mounted above the conveyor 3 with an apron 10 extending between them and above the conveyor band, so that the dough pieces are kept slowly turning over as they pass towards the delivery. The compressing action brings the plaque adjacent surfaces into contact with one another, and as each dough piece leaves the end of the conveyor it falls into the baking tin 11 with its axis coincident with or parallel to the longitudinal axis of the tin. The tins may be mounted on a conveyor which automatically brings them into position at the discharge station of the dough-conveying apron.

The conveyor 3 and discs 7 are driven from a motor 12 by chain and sprocket gear 13, 14.

In carrying the invention into effect according to an alternative mode in which spindle moulding means are employed, see Figures 3, 4, and 5, the dough sheeting rolls 15, 16 are mounted to deliver predetermined sheeted pieces of dough down a short chute 17 to a station whereat the dough pieces in turn are engaged by dough moulding spindles 18, 19 projected axially from a pair of facing plates or heads 20, 21 mounted to rotate about an axis and cause the moulding spindles, while rotating on their own axes, constantly to travel in a circular path. Between the faces of the spindle plates 20, 21 a series of discs 22 are mounted. These discs correspond in number with the number of recesses to be formed in the dough pieces to form the necked plaques.

Instead of the discs 22 a series of arcuate blades may be provided, the arc of the blades extending somewhat over a semi-circle from the charging station to a discharging station.

The moulding spindles 18, 19 revolve (about their own axes) continuously in a direction adapted to cause the outward side of the dough sheets to be rolled forwardly over against the stationary discs 22 while they are carried on their arcuate course around the axes of the discs. As the dough pieces arrive at the charging station the spindles 18, 19 are projected inwardly towards one another to engage the dough piece and as the spindles approach the discharging station the spindles are retracted outwardly to release the necked cylinders of dough. These movements of the spindles are effected by fixed cams 23 (only one being shown) with which rolls 24 engage, such rolls being carried by levers 25 pivoted on the rotary mounting 26 of the spindles and having forked ends 27 engaging spaced flanges on the spindles. After leaving the spindles the dough pieces are subjected to a final rolling or shaping operation between a shaping board 28 and a co-operating endless conveyor 29, which board may also cause the plaques to move together axially by the provision of converging side walls.

The drive for the spindle mounting 26, and the spindles themselves is taken from a shaft 30 through gearing 31 and 32 respectively. The sheeting rolls 15, 16 are also driven from the shaft 30 by gearing 33.

According to a modification of the apparatus just described, instead of employing fixed discs or blades to impress the recesses in the dough pieces, a rotary series of discs 34 may be utilized (similar to those described in reference to the first method of carrying the invention into effect). The discs 34 are mounted upon the hollow shaft 35 which is driven from the shaft 30 by gearing 36. The discs 34 are rotated so that they move downwardly towards the shaping board 28, i. e. clockwise as seen in Figure 6 and consequently the spindles are rotated counterclockwise so that the drive from the shaft 30 to the spindle mounting 26 and sheeting rolls do not require idler wheels in the gearing 31 and 33 as in the modification shown in Figures 3 and 4. In this case, the moulding spindles revolve in the opposite direction to that described while they travel in an orbit about the disc axis, the rolling operation being preferably completed in about a semi-circular arc of travel.

In the above modes of carrying out the invention, any tendency of the dough to stick to the discs or plates may be prevented by dusting with flour or by subjecting the surfaces to the drying action of a blast or current of air.

I claim:

1. Apparatus for forming dough pieces in the manufacture of tin bread having a laminated structure of the character described, comprising means for producing a series of spaced annular corrugations in an elongated dough piece to provide spaced parallel plaques connected together by necks of relatively small diameter, conveyor means for receiving the necked dough pieces and feeding them through means for exerting axial pressure on the ends of the necked dough piece to bring the sides of the plaques into contact with one another and merge the connecting necks into the body of the dough.

2. Apparatus for forming dough pieces in the manufacture of tin bread having a laminated structure of the character described, comprising conveyor means, means cooperating with said conveyor means for moulding an elongated dough piece, said conveyor means feeding the elongated dough piece to means for impressing a series of spaced annular recesses in said dough piece to form plaques united by necks of relatively small diameter, said conveyor means receiving the necked dough pieces and delivering them to means for applying axial pressure on the ends of the necked dough piece to bring the sides of the plaques into contact with one another and merge the connecting necks into the body of the dough.

3. Apparatus for producing multiple necked dough pieces having a series of spaced plaques connected by necks, comprising conveyor means for feeding elongated dough pieces to corregating means, coaxial spaced discs mounted for rotation and means for causing a relative rolling motion to take place between the discs and a cylinder of dough to form annular recesses in the dough piece, said conveyor means receiving the necked dough pieces after treatment by said spaced discs.

4. Apparatus as claimed in claim 3, wherein the discs are located within cooperating stationary blades and are spaced therefrom, the necks of the dough pieces being formed in said spaces.

5. Apparatus as claimed in claim 3, wherein the discs are located within cooperating stationary blades and are spaced therefrom, the spaces decreasing in the direction of feed whereby the necks of the dough piece are progressively reduced.

6. Apparatus as claimed in claim 3, wherein said conveyor means feed the necked dough pieces through means for applying pressure to the ends of the necked dough piece to close the plaques axially and merge the connecting necks into the body of the dough.

7. Apparatus as claimed in claim 3, wherein said conveyor means feed the necked dough pieces through means for applying pressure to the ends of the necked dough piece to close the plaques axially and merge the connecting necks into the body of the dough, comprising a pair of laterally converging boards located above said conveying means and an apron extending between the boards adapted to cause the dough piece to roll between the boards.

8. Apparatus for producing dough pieces having a series of spaced plaques connected by necks, comprising a series of spaced stationary discs, a series of dough coiling spindles located around said discs, means for rotating the spindles about their own axis and orbitally about the discs, means for feeding sheeted dough pieces to the spindles whereby the dough pieces are coiled upon the spindles and brought into engagement with the discs to impressed spaced annular recesses in said dough pieces and means for axially displacing the spindles to release the necked dough pieces.

9. Apparatus as claimed in claim 8, wherein the space between the orbit of the axes of the spindles and the discs decreases in the direction of the orbital movement whereby the necks of the dough pieces are progressively reduced.

10. Apparatus as claimed in claim 8, wherein conveyor means are provided for receiving the necked dough pieces from the spindles and feeding them through means for applying pressure to the ends of the necked dough pieces to close the plaques and merge the connecting necks into the body of the dough.

11. Apparatus for producing dough pieces having a series of spaced plaques connected by necks, comprising a series of spaced discs mounted for rotation, means for rotating the discs, a series of dough coiling spindles located around said discs, means for rotating the spindles about their own axes and orbitally about the discs, means for feeding sheeted dough to the spindles whereby the dough pieces are coiled upon the spindles and brought into engagement with the discs to impressed spaced annular recesses in said dough pieces, and means for axially displacing the spindles to release the necked dough pieces.

12. Apparatus as claimed in claim 11, wherein conveyor means are provided for securing the necked dough pieces and feeding them through means for axially closing the plaques upon one another and to merge the connecting necks into the body of the dough.

LAURENCE SEYMOUR HARBER.